United States Patent [19]

Wichansky

[11] Patent Number: 4,964,689
[45] Date of Patent: Oct. 23, 1990

[54] CONNECTOR FOR SPLICING OPTICAL FIBERS

[75] Inventor: Howard Wichansky, Freehold, N.J.

[73] Assignee: The United States of America as represented by the Secretary of the Army, Washington, D.C.

[21] Appl. No.: 958,595

[22] Filed: Nov. 7, 1978

[51] Int. Cl.$^5$ .............................................. G02B 6/38
[52] U.S. Cl. ............................... 350/96.21; 156/158; 156/433
[58] Field of Search ........................ 350/96.20, 96.21; 156/433, 296, 304, 502, 158

[56] References Cited

U.S. PATENT DOCUMENTS

| | | |
|---|---|---|
| 3,870,395 | 3/1975 | Schicketanz . |
| 3,919,037 | 11/1975 | Miller ............................. 350/96.21 |
| 3,944,328 | 3/1976 | Kent et al. ....................... 350/96.21 |
| 3,948,582 | 4/1976 | Martin ............................. 350/96.21 |
| 4,008,948 | 2/1977 | Dalgleish et al. ................ 350/96.21 |
| 4,046,453 | 9/1977 | Fiebelkorn et al. .............. 350/96.21 |
| 4,057,448 | 11/1977 | Miller ............................. 156/304 |
| 4,078,910 | 3/1978 | Dalgoute ......................... 350/96.21 |
| 4,101,198 | 7/1978 | Heldt .............................. 350/96.20 |

FOREIGN PATENT DOCUMENTS 2512330 9/1975 Fed. Rep. of Germany ... 350/96.21
2734796 9/1978 Fed. Rep. of Germany ... 350/96.21

OTHER PUBLICATIONS

Dalgleish, J. F., "Connections—Well—Designed Splices, Connectors Must Align Fibers Exactly", Electronics, Aug. 5, 1976, pp. 96–98.
Miller, C. M., "Loose Tube Splices for Optical Fibers", Bell System Technical Journal, Sep. 1975, pp. 1215–1225.

Primary Examiner—John D. Lee
Attorney, Agent, or Firm—Michael Zelenka; John M. O'Meara

[57] ABSTRACT

A connector splicing optical fibers wherein a glass sleeve, having a precision cut bore formed therein, is provided with funnel-shaped access openings at each end thereof for receiving the ends of the glass fibers to be spliced. In one embodiment, a permanent splice is made by applying a bonding agent and sealant to the funnel-shaped openings, and in another embodiment, a retainer ring is employed to thereby provide a disconnectable splice.

5 Claims, 2 Drawing Sheets $d = 136 \mu m - 119 \mu m$
$= 17 \mu m$
$d/D = \frac{17}{119} = 0.14$
COUPLING LOSS ≅ 0.7 dB FIG.7
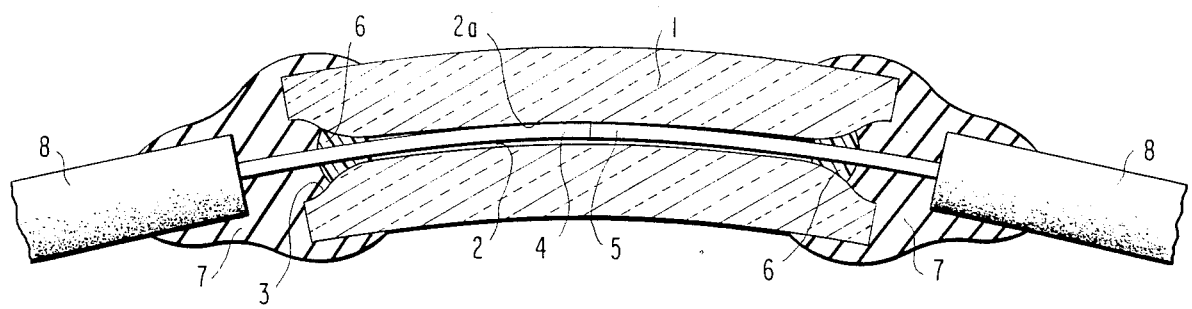
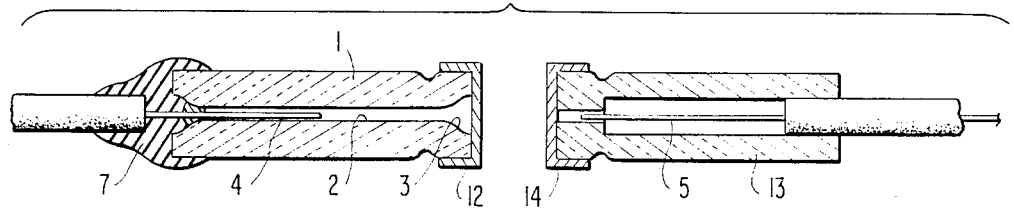
FIG.9A
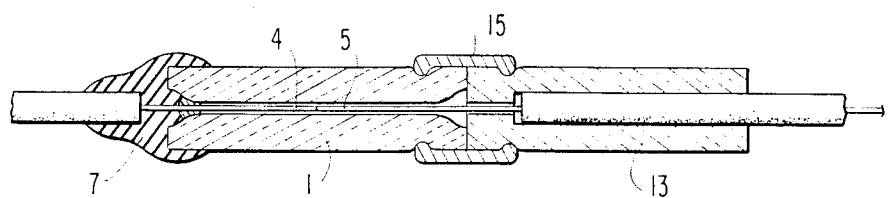
FIG.9B
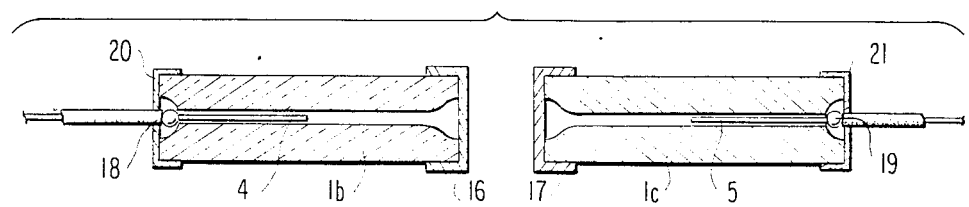
FIG.10A
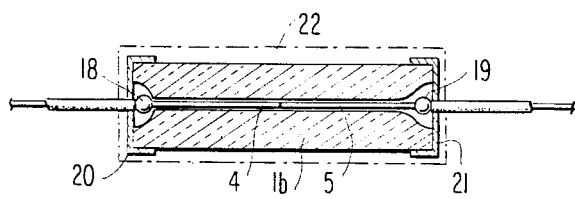
FIG.10B
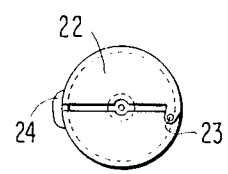
FIG.10C

CONNECTOR FOR SPLICING OPTICAL FIBERS

The invention described herein may be manufactured and used by or for the Government for governmental purposes without the payment of any royalties thereon or therefor.

BACKGROUND OF THE INVENTION

Heretofore, the most advanced permanent splicing techniques have employed a V-grooved connector to achieve proper alignment of the fibers to be spliced, and then, either an aluminum pressure bond ring, epoxy, or a crimped sleeve is applied to join the fibers, end-to-end.

While these splicing techniques have been satisfactory for their intended purpose, they have been characterized by certain objections. For instance, the small V-grooves in the connector are formed by special metal embossing techniques which are not compatible with low cost production. Furthermore, the V-grooved connector is bulky and can only be used for cable the V-groove. As a result of the fiber being placed in the epoxy, care must be taken to prevent the epoxy from coming between the ends of the mating fibers, otherwise an epoxy having the proper optical properties must be used. When using crimped sleeves, stresses or microcracks can be induced at points of contact with the fiber.

As another alternative, permanent splices have been obtained by heating and fusing the fiber ends; however, this technique requires large power supplies, a complex and sensitive fiber alignment operation, and it is characterized by low fiber bond strengths.

To overcome the disadvantages experienced in prior techniques for splicing optical fibers, after considerable research and experimentation, the connector of the present invention has been devised which comprises, essentially, a glass sleeve having a precision cut bore formed therein. Funnel-shaped access openings are provided at each end of the bore for receiving the mating ends of the glass fibers to be spliced. In one embodiment, a permanent splice is made by applying a bonding agent and sealant to the funnel-shaped openings, and in another embodiment a retainer ring is employed to thereby provide a disconnectable splice.

By the construction and arrangement of the connector of the present invention, the precision bore in the glass sleeve provides self-alignment of the mating fiber ends, and the funnel-shaped openings facilitate rapid manual insertion of the fibers at each end of the sleeve.

BRIEF DESCRIPTION OF THE DRAWINGS

FIG. 7 is an enlarged, sectional side elevational view of the glass sleeve formed with a slight curvature;

FIGS. 9A and 9B are schematic views illustrating the use of a retainer ring for connecting an abutting glass sleeve and a connector shell to thereby provide a disconnectable splice;

FIGS. 10A and 10B are schematic views of another embodiment of a disconnectable splice; and FIG. 10C is an end view of the retainer ring employed in the embodiment of FIGS. 10A and 10B.

DESCRIPTION OF THE PREFERRED EMBODIMENTS

Figure 1:
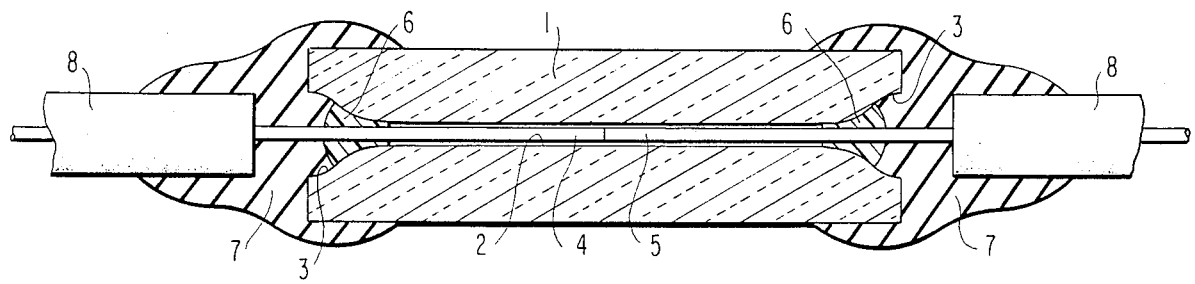
FIG. 1 is an enlarged, sectional side elevational view of the glass sleeve of the present invention employed in permanently splicing optical fibers.
Figure 2:
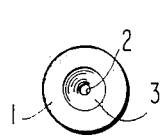
FIG. 2 is an end view of the glass sleeve.

Referring to the drawings, and more particularly to FIG. 1 thereof, the connector of the present invention comprises a glass sleeve 1 having a precision cut bore 2 formed therein and funnel-shaped openings 3 communicating with the bore at each end of the sleeve. The openings 3 guide the end portions of the optical fibers 4 and 5, to be spliced, into the bore 2, and a permanent splice is obtained by applying a bonding agent 6 to the neck of the funnel openings 3 and a flexible protective jacket 7 is molded over the fiber-connector interface.

Figure 5:
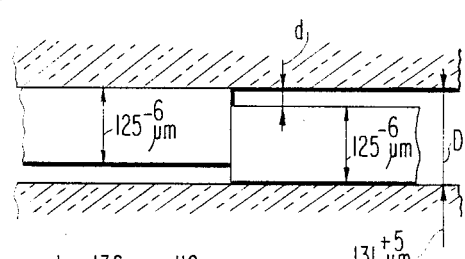
FIG. 5 is a fragmentary, side elevational view of a bore in a glass sleeve, illustrating parameters for the worst mating conditions for optical fiber ends.

The diameter of the sleeve bore 2 is specified so that its minimum value within fabrication tolerance will be equivalent to the maximum upper tolerance of the fibers 4 and 5. Since the diameter of the bore 2 dictates the magnitude of coupling loss by transverse misalignment, this source of coupling loss is the major consideration. Axial misalignment of the fiber ends is negligible if good fiber ends are made since the bore 2 provides self-axial alignment of the fiber ends. The precision cut bore is fabricated to the specified dimensions $\pm 0.2$ mils ($5\mu m$) and the glass fibers customarily used have an outside diameter (OD) of $125\mu m \pm 6\mu m$. FIG. 5 illustrates an extreme example of misalignment between two fibers having the minimum contemplated OD of $119\mu m$. In this instance, the Bore ID Max. (D) = Fiber OD Max. + Max. Upper Tolerance; thus, $D = 131 + 5\mu m = 136\mu m$. The clearance, $d$, = Bore I.D. max $- D_1$ (the minimum fiber OD); therefore, $d = 136 - 119\mu m = 17\mu m$. The transverse displacement is represented by the ratio of $d/D_1$ which = $17/119 = 0.14$. This displacement represents a coupling loss equivalent to 0.7dB which compares favorably with the coupling loss requirements for fiber cable connectors of 1.0dB.

The outside diameter of the sleeve 1 is maintained as small as possible so as not to add additional bulk to the fiber. An outside diameter significantly larger than the fiber protective jacket or cable outside diameter will result in discontinuity resulting in problems during payout of the fiber from a reel; accordingly, sleeves having an outside diameter of 3 mm and a funnel opening diameter of 1.5 mm are contemplated.

Figure 6A:
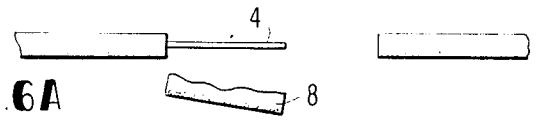
FIGS. 6A to 6F are schematic views illustrating the steps of fabricating a permanent splice employing the glass sleeve of the present invention.
Figure 6B:
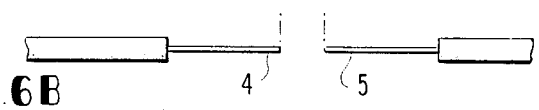
Figure 6C:
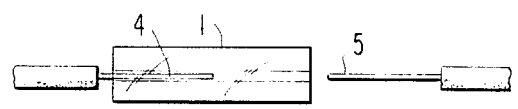
Figure 6D:
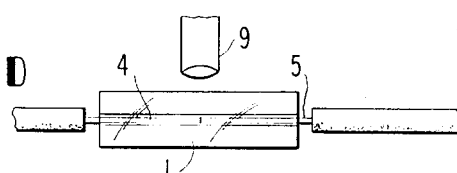
Figure 6E:
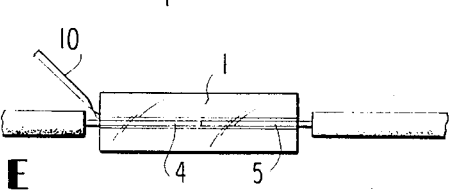

Referring to FIGS. 6A through 6F, the method of splicing a pair of optical fibers is schematically illustrated. As will be seen in FIGS. 6A and 6B, the outer protective jacket 8 is removed from the end portions of each of the fibers 4 and 5, and the ends of the fibers to be mated are fractured in such a manner to provide flat and perpendicular faces. The optical fiber 4 is then inserted into the middle of the bore of glass sleeve 1 (FIG. 6C), the insertion being facilitated by the funnel-shaped opening 3, as shown in FIG. 1. The fiber 5 is then inserted into the opposite end of the sleeve 1 until the two flat end faces make contact (FIG. 6D). The contact can be verified by examining the region through a low power microscope 9. Because of the close tolerance between the sleeve inside diameter and the outside diameter of each fiber, the fibers tend to remain in place; however, if desired, suitable means may be employed to hold the fibers and sleeve. A suitable bonding agent 6 is then applied to each funnel-shaped opening by means of a needle type applicator 10 (FIG. 6E), and finally, a flexible protective jacket 7 of soft urethane base rubber is applied (FIG. 6F) to achieve the necessary flexing strength.

Figure 3:
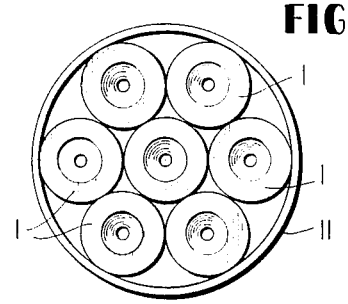
FIG. 3 is an end view of a bundle of glass sleeves for splicing a multiple strand fiber cable.

While the description thus far has been for a single fiber cable, the precision bore glass sleeve concept can be employed for splicing a multiple strand fiber cable as shown in FIG. 3 wherein a plurality of the glass sleeves 1 are arranged in a bundle and held therein by a suitable retainer ring 11.

Figure 4:
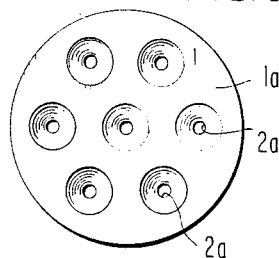
FIG. 4 is an end view of a glass sleeve having a plurality of precision bores formed therein for splicing a multiple strand fiber cable.

FIG. 4 illustrates another alternative for splicing a multiple strand fiber cable wherein a single sleeve 1a is formed with a plurality of precision cut bores 2a.

Figure 8:
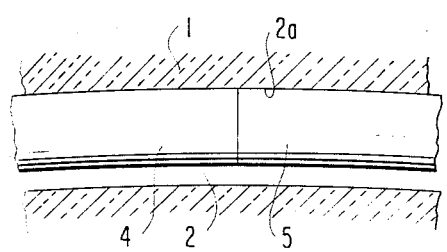
FIG. 8 is an enlarged, fragmentary, side elevational view of the abutting ends of the optical fibers in the bore of the sleeve shown in FIG. 7.
Figure 6F:
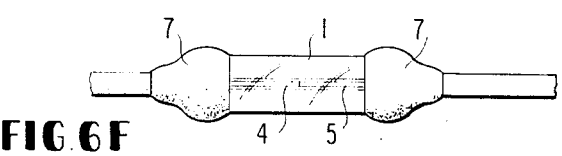

In order to insure a more accurate alignment of fibers having different outside diameters and to prevent fibers from being centered out of alignment due to the gap, d, between the sleeve wall and the fiber outside diameter, the sleeve can be formed with a slight curvature, as shown in FIGS. 7 and 8, whereby the fibers 4 and 5 abut the outside wall 2a of the bore.

The basic concept of the glass sleeve shown in FIG. 1 lends itself to be employed in a rematable or disconnectable splice assembly as shown in FIGS. 9A and 9B, wherein the fiber 4 is permanently mounted in the glass sleeve 1 as described above. The opposite end of the sleeve 1 is provided with a removable protective cover 12 to keep the end of the fiber 4 clean prior to splicing. The fiber 5 is contained in a shell 13 also provided with a protective cover 14. To effect the splice, the protective covers 12 and 14 are removed and the ends of the sleeve 1 and shell 13 are abutted in face-to-face relationship and fastened by a suitable retaining clip 15. The fiber 5 is then moved laterally into the bore 2 of sleeve 1, being guided therein by the funnel-shaped opening 3, until it abuts the end face of the fiber 4.

Another embodiment of a rematable splice assembly is shown in FIGS. 10A, 10B and 10C, wherein each end of the fibers 4 and 5 is provided with a glass sleeve 1b and 1c, respectively, having a precision cut bore. The free ends of the sleeves are provided with dust covers 16 and 17, and instead of a permanent bond, as described hereinabove in connection with FIG. 1, the fibers 4 and 5 are connected to their respective sleeves by spherical members 18 and 19 mounted on the fibers and held in the funnel-shaped openings by caps 20 and 21 mounted on the ends of the sleeves. When making the splice, the fiber 5 and associated spherical member 19 and cap 21 are removed from the sleeve 1c, and the fiber 5 is inserted into the bore of sleeve 1b until the end face thereof abuts the end face of the fiber 4. In order to hold the end faces of the fibers 4 and 5 in face-to-face abutting relationship, a retainer ring 22 is provided. The retainer ring 22 comprises a split cylindrical housing, the side walls of which being hingedly connected as at 23, a clamp or fastener 24 being provided to hold the ring around the sleeve 1b and the caps 20 and 21.

It is to be understood that the forms of the invention herewith shown and described are to be taken as preferred examples of the same and that various changes in the shape, size and arrangement of parts may be resorted to, without departing from the spirit of the invention or scope of the subjoined claims.

I claim:

1. A connector for splicing optical fibers comprising a sleeve, at least one precision cut axial bore provided in said sleeve, funnel-shaped openings provided at each end of said sleeve communicating with said bore, said openings facilitating the insertion of the ends of the optical fibers to be spliced into said sleeve, the diameter of said bore providing a close fit for said fibers and having a minimum value within fabrication tolerance equivalent to the diametrical upper tolerance of the fibers to be spliced, a pair of optical fibers positioned within respective sleeve ends so that said fiber ends abut, means at the ends of said sleeve for securing said fibers therein, said means including means positioned around the fiber within at least one of said funnel-shaped openings and spaced from the abutting ends for holding a respective fiber in said sleeve, a bonding agent applied to the throat of at least one of the funnel-shaped openings for securing the respective fiber to said sleeve, wherein one of said fibers is secured to said sleeve, and a shell secured to the other of said fibers, one end of said sleeve abutting an end of said shell in face-to-face relationship, and having a retaining clip secured to said sleeve and said shell for holding the sleeve and shell in said face-to-face relationship.

2. A connector for splicing optical fibers comprising a sleeve, at least one precision cut axial bore provided in said sleeve, funnel-shaped openings provided at each end of said sleeve communicating with said bore, said openings facilitating the insertion of the ends of the optical fibers to be spliced into said sleeve, the diameter of said bore having a minimum value within fabrication tolerance equivalent to the diametrical upper tolerance of the fibers to be spliced, a pair of optical fibers positioned within respective sleeve ends so that said fiber ends abut, and means at the ends of said sleeve for securing said fibers therein, said means including means positioned around the fiber within at least one of said funnel-shaped openings and spaced from the abutting ends for holding a respective fiber in sad sleeve, wherein said means within said funnel-shaped openings includes a spherical member mounted on each said fiber.

3. The device of claim 2 including a pair of caps mounted on opposite ends of said sleeve having openings for said fibers and holding the spherical members within said funnel-shaped openings.

4. The connector for splicing optical fibers according to claim 3 including a retainer ring mounted on said sleeve for holding said caps on said opposite ends and holding said fibers in spliced relationship.

5. The connector for splicing optical fibers according to claim 4, wherein the retainer ring comprises a split cylindrical housing, the walls of said housing being hingedly connected, and a fastener for securing said housing around said sleeve.

* * * * *